(12) United States Patent
Miller

(10) Patent No.: US 6,951,990 B1
(45) Date of Patent: Oct. 4, 2005

(54) APPARATUS FOR RACKING CIRCUIT BREAKERS INTO AND OUT OF SWITCHGEAR

(75) Inventor: Michael Wayne Miller, Burlington, IA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/999,071

(22) Filed: Nov. 29, 2004

(51) Int. Cl.[7] .............................................. H01H 9/20
(52) U.S. Cl. ................................. 200/50.21; 200/50.24
(58) Field of Search ... 200/50.21–50.27; 361/606–617

(56) References Cited

U.S. PATENT DOCUMENTS

| | | | | |
|---|---|---|---|---|
| 3,716,684 A | * | 2/1973 | McMillen et al. | 200/50.21 |
| 4,396,813 A | * | 8/1983 | Hesselbart et al. | 200/50.21 |
| 5,354,960 A | * | 10/1994 | Erickson | 200/400 |
| 5,453,587 A | * | 9/1995 | Hurley et al. | 200/50.24 |
| 5,477,017 A | * | 12/1995 | Swindler et al. | 200/50.24 |
| 6,160,229 A | * | 12/2000 | Grelier et al. | 200/50.26 |
| 6,777,627 B1 | * | 8/2004 | Stevenson | 200/50.21 |

* cited by examiner

*Primary Examiner*—Michael A. Friedhofer
(74) *Attorney, Agent, or Firm*—Cantor Colburn LLP

(57) ABSTRACT

A motorized racking operator for racking a circuit breaker into and out of electrical switchgear is disclosed. The racking operator includes a motor, an On-Off control in signal communication with the motor, an anti-rotation bracket securely attached to the motor, and a latch. The motor has a drive shaft with an end configured to operably engage with a receiving end of a racking shaft. The latch serves to removably secure the motor and bracket to the circuit breaker such that the motor and bracket move in unison with the circuit breaker in response to the motor driving the racking shaft to rack the circuit breaker into and out of the switchgear. The anti-rotation surface of the bracket engages with a surface of the circuit breaker to prevent rotation of the motor in response to the motor applying a torque to the racking shaft.

15 Claims, 6 Drawing Sheets

APPARATUS FOR RACKING CIRCUIT BREAKERS INTO AND OUT OF SWITCHGEAR

BACKGROUND OF THE INVENTION

The present disclosure relates generally to an apparatus for racking circuit breakers into and out of switchgear, and particularly to a motorized racking operator.

In the field of electrical power distribution, both fixed and draw-out type circuit breakers are commonly used and housed in switchgear. Draw-out type circuit breakers are often employed in installations where frequent or routine connection and disconnection of the circuit breaker from the power conductors is desired. To facilitate such operation, racking systems are employed for safely racking the circuit breaker into and out of the switchgear. Such racking systems may include hand cranks or motor driven operators. Where motor driven operators are used, they typically involve complex linkages and anti-torque mounting arrangements that provide the desired racking force while preventing the racking assembly from rotating in response to the circuit breaker being racked into and out of the switchgear. Accordingly, and while existing racking systems may be suitable for their intended purpose, there still remains a need for improvements in the art of motorized racking operators for circuit breakers.

BRIEF DESCRIPTION OF THE INVENTION

Embodiments of the invention include a motorized racking operator for racking a circuit breaker into and out of electrical switchgear. The racking operator includes a motor, an On-Off control in signal communication with the motor, an anti-rotation bracket securely attached to the motor, and a latch. The motor has a drive shaft with an end configured to operably engage with a receiving end of a racking shaft. The latch serves to removably secure the motor and bracket to the circuit breaker such that the motor and bracket move in unison with the circuit breaker in response to the motor driving the racking shaft to rack the circuit breaker into and out of the switchgear. The anti-rotation surface of the bracket engages with a surface of the circuit breaker to prevent rotation of the motor in response to the motor applying a torque to the racking shaft.

Other embodiments of the invention include a motorized racking operator for racking a circuit breaker into and out of electrical switchgear. The racking operator includes a motor, a bracket, and a spring-biased latch. The motor has a drive shaft with an end configured to operably engage with a receiving end of a racking shaft. The bracket is securely attached to the motor and has a protruding portion that engages with a recessed region of the circuit breaker. The spring-biased latch serves to removably secure the motor and bracket to the circuit breaker such that the motor and bracket move in unison with the circuit breaker in response to the motor driving the racking shaft to rack the circuit breaker into and out of the switchgear. The protruding portion of the bracket engages with the recessed region of the circuit breaker to prevent rotation of the motor in response to the motor applying a torque to the racking shaft.

Further embodiments of the invention include a motorized racking operator for racking a circuit breaker into and out of electrical switchgear. The racking operator includes a motor, an On-Off control in signal communication with the motor, a bracket securely attached to the motor, and a latch. The motor has a drive shaft with an end configured to operably engage with a receiving end of a racking shaft, and the bracket has a pin displaced from the motor drive shaft and oriented parallel thereto. The latch serves to removably secure the motor and bracket to the circuit breaker such that the motor and bracket move in unison with the circuit breaker in response to the motor driving the racking shaft to rack the circuit breaker into and out of the switchgear. The pin of the bracket engages with a surface of the circuit breaker to prevent rotation of the motor in response to the motor applying a torque to the racking shaft.

BRIEF DESCRIPTION OF THE DRAWINGS

Referring to the exemplary drawings wherein like elements are numbered alike in the accompanying Figures.

DETAILED DESCRIPTION OF THE INVENTION

An embodiment of the invention provides a motorized racking operator for racking a circuit breaker into and out of electrical switchgear, which has a housing for supporting the circuit breaker, a racking shaft and a racking mechanism. The racking shaft has a receiving end for receiving an actuator that rotates the racking shaft to cause movement of the racking mechanism that results in the circuit breaker being racked into and out of the switchgear. As a result of the operator being mounted directly to the circuit breaker, the operator moves with the circuit breaker as the circuit breaker is being racked into and out of the switchgear.

Figure 1:
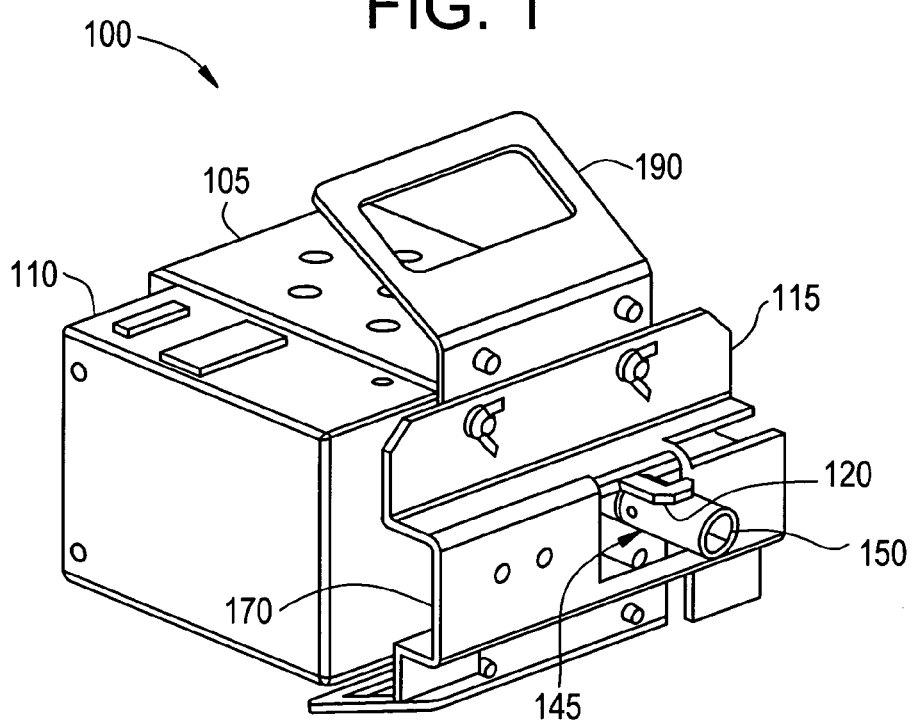
FIG. 1 depicts an isometric view of an exemplary motorized racking operator in accordance with embodiments of the invention.
Figure 2:
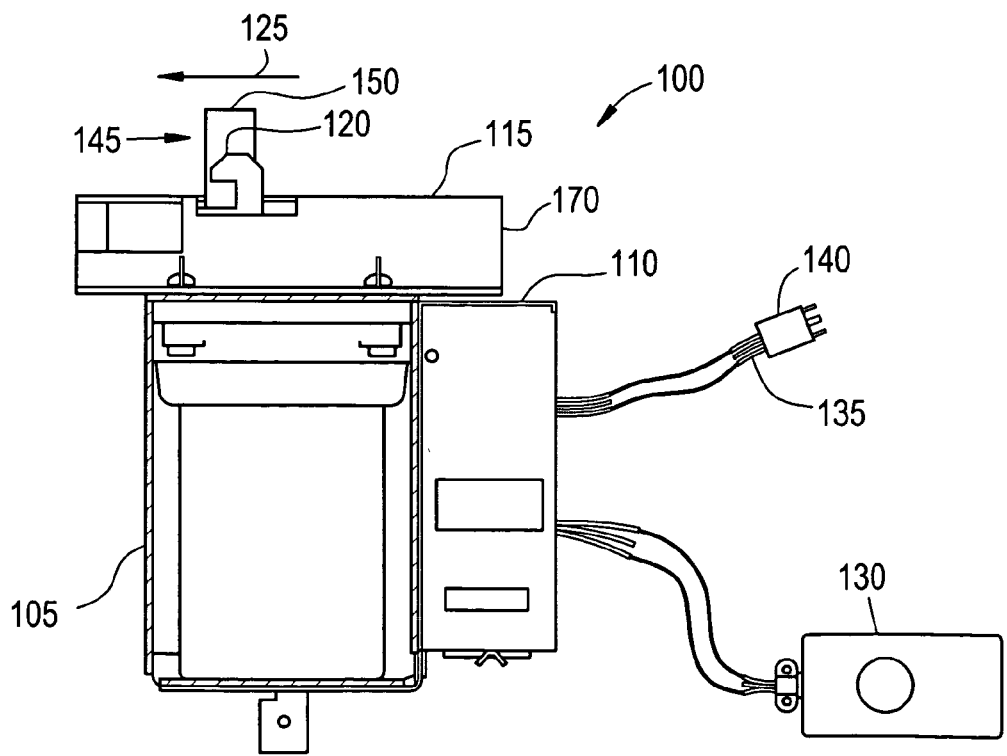
FIG. 2 depicts a top plan view of the operator of FIG. 1.

FIGS. 1 and 2 depict an exemplary embodiment of a motorized racking operator (operator) 100 in isometric view (FIG. 1) and top plan view (FIG. 2). In an embodiment, operator 100 includes a motor 105, an On-Off control 110 in signal communication with the motor 105, a bracket 115 securely attached to the motor 105, and a latch 120. In an embodiment, latch 120 is a spring-loaded latch that is biased in the direction of arrow 125 (FIG. 2). The On-Off control 110 may be operated by a hand-held actuator 130, or via a signal path that connects to another actuator, not shown, at a remote location. A power cord 135 and plug 140 for connection to a wall outlet provide power to the operator 100. In an embodiment, and as depicted in FIGS. 1 and 2, the On-Off control 110 may be attached directly to the motor 105 and hard-wired thereto. However, other embodiments of the invention include the On-Off control 110 being separated from the motor 105 and in signal communication therewith via infrared signal or other suitable means. Motor 105 has a drive shaft 145 with an end 150 that is configured to operably engage with the receiving end 155 of a racking shaft 160 of a circuit breaker 165, best seen by referring to FIG. 3. In an embodiment, the receiving end 155 of racking shaft 160 is of a square head type, and the end 150 of motor drive shaft 145 is of a mating square socket type.

Figure 3:
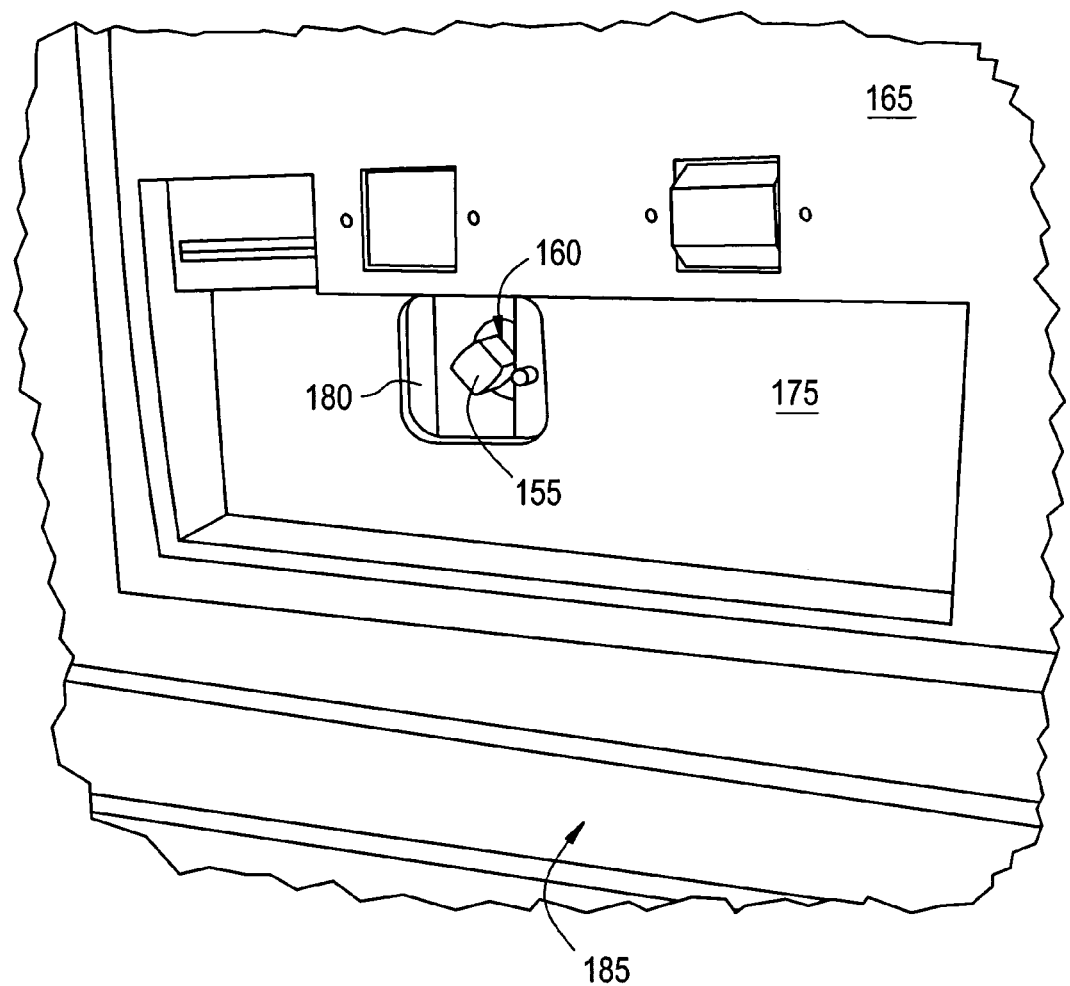
FIG. 3 depicts a partial front view of a circuit breaker for use in accordance with embodiments of the invention.

Referring now to FIGS. 1–3 collectively, bracket 115 has a protruding rectangular portion 170 that engages with a recessed rectangular region 175 of the circuit breaker 165. When operator 100 is assembled onto circuit breaker 165, the protruding portion 170 engages with the recessed region 175, the drive shaft end 150 engages with the racking shaft end 155, and the latch 120 removably engages with a latching surface 180 of circuit breaker 165. In this manner, the protruding portion 170 provides an anti-rotation surface that engages with the recessed region 175 such that the motor 105 is prevented from rotating in response to the motor 105 applying a torque to the racking shaft 160. In the assembled state, the operator 100 is latched directly to the circuit breaker 165, thereby resulting in the operator 100 and the circuit breaker 165 moving in unison in response to the motor 105 driving the racking shaft 160 to rack the circuit breaker 165 into and out of the switchgear 185. In response to the motor 105 driving the racking shaft 160 to rack the circuit breaker 165 into and out of the switchgear 185, the bracket 115 moves with the circuit breaker 165 absent relative motion therebetween. For ease of installation of operator 100 to circuit breaker 165, an embodiment of bracket 115 includes a handle 190.

Figure 4:
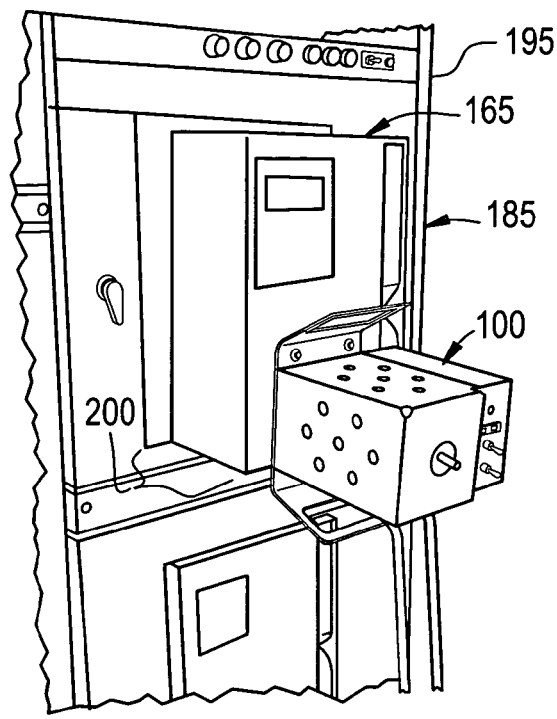
FIGS. 4 and 5 depict partial isometric front views of switchgear employing the operator of FIG. 1 in accordance with embodiments of the invention.
Figure 5:
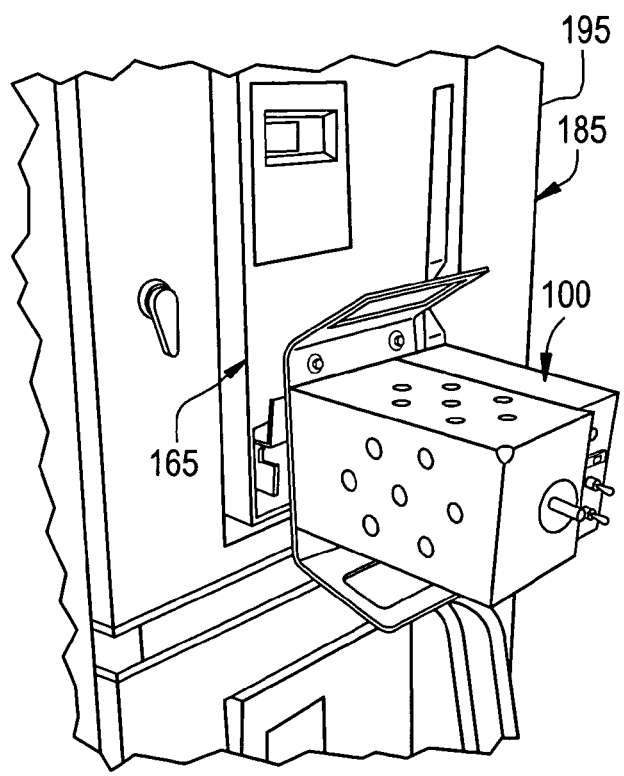

Reference is now made to FIGS. 4 and 5, which depict operator 100 mounted to circuit breaker 165, and circuit breaker 165 mounted to electrical switchgear 185. As depicted, switchgear 185 has a housing (frame) 195 for supporting circuit breaker 165. In FIG. 4, circuit breaker 165 and operator 100 are racked out of (disconnected from) switchgear 185, and in FIG. 5 circuit breaker 165 and operator 100 are racked into (connected with) switchgear 185. The distance of travel between a racked in and a racked out position is shown by numeral 200 in FIG. 4. As illustrated, circuit breaker 165 and operator 100 move in unison during a racking in and a racking out operation.

Figure 6:
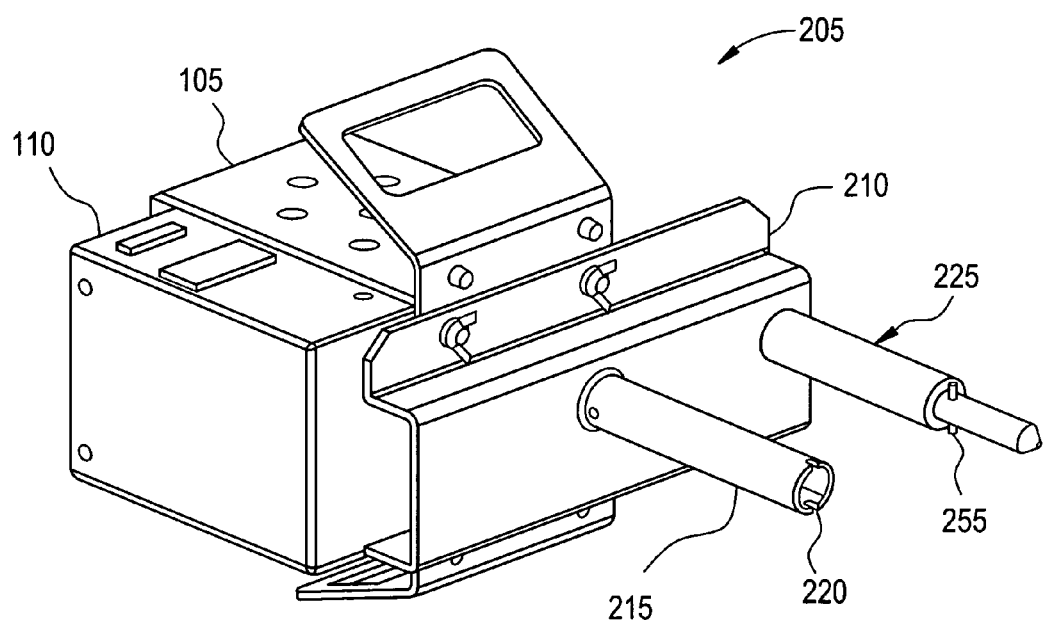
FIG. 6 depicts an isometric view of an alternative operator to that depicted in FIG. 1.

In an alternative embodiment, and with reference now to FIG. 6, operator 205 includes motor 105, On-Off control 110, and a bracket 210, which is similar to but different from bracket 115. An elongated drive shaft 215 is attached to motor 105 and has an end 220 for engaging with a racking shaft in a similar fashion as discussed previously. Bracket 210 differs from bracket 115 by having a pin 225 in place of the latch 120. Pin 225 is displaced from the drive shaft 215 and is oriented parallel to the drive shaft 215. The placement of pin 225 relative to drive shaft 215 is used to prevent rotation of operator 205 in response to motor 105 applying a torque to a racking shaft 230, which is best described with reference FIG. 7.

Figure 7:
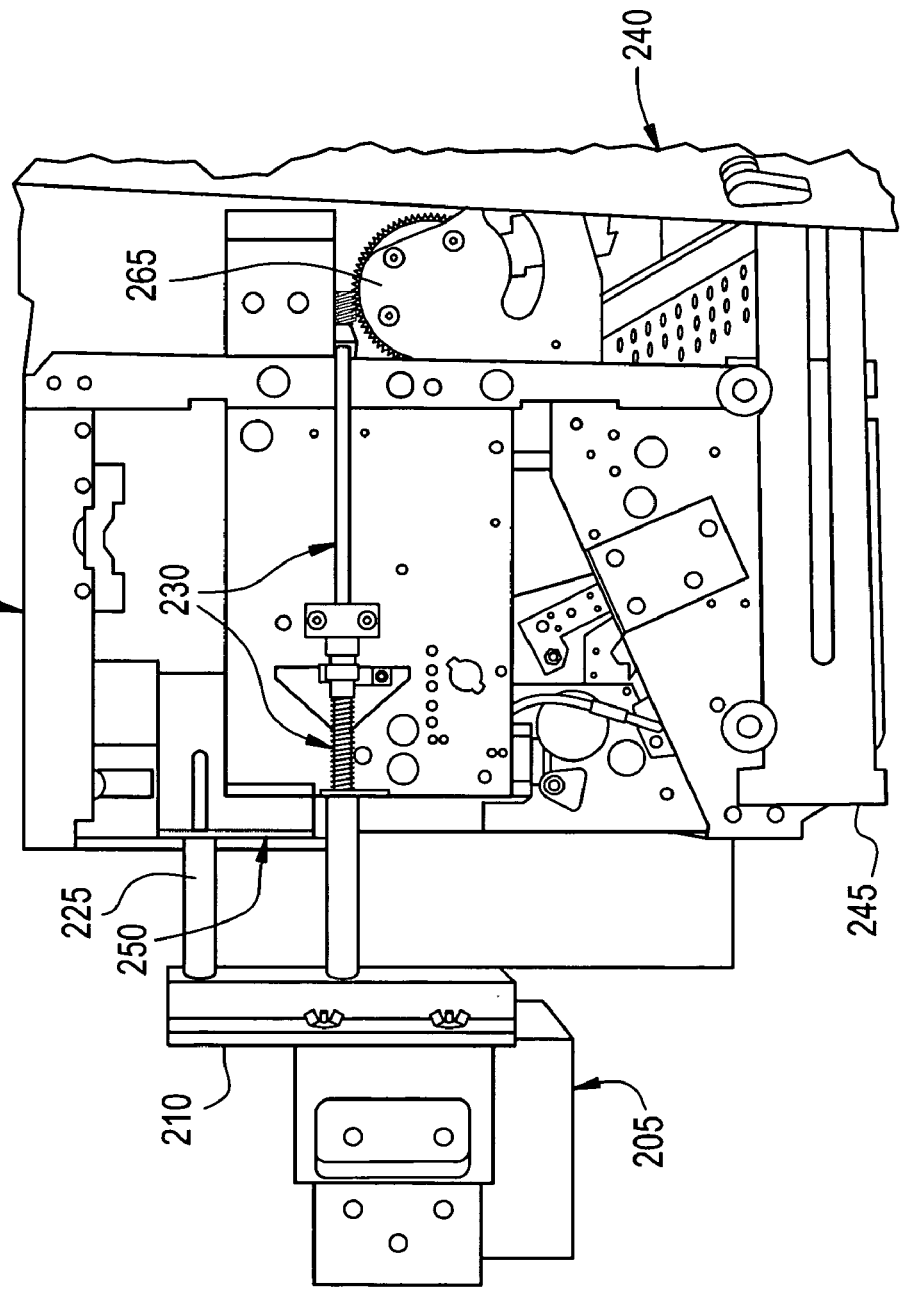
FIG. 7 depicts a partial side view of a switchgear employing the operator of FIG. 6 in accordance with embodiments of the invention.
Figure 8:
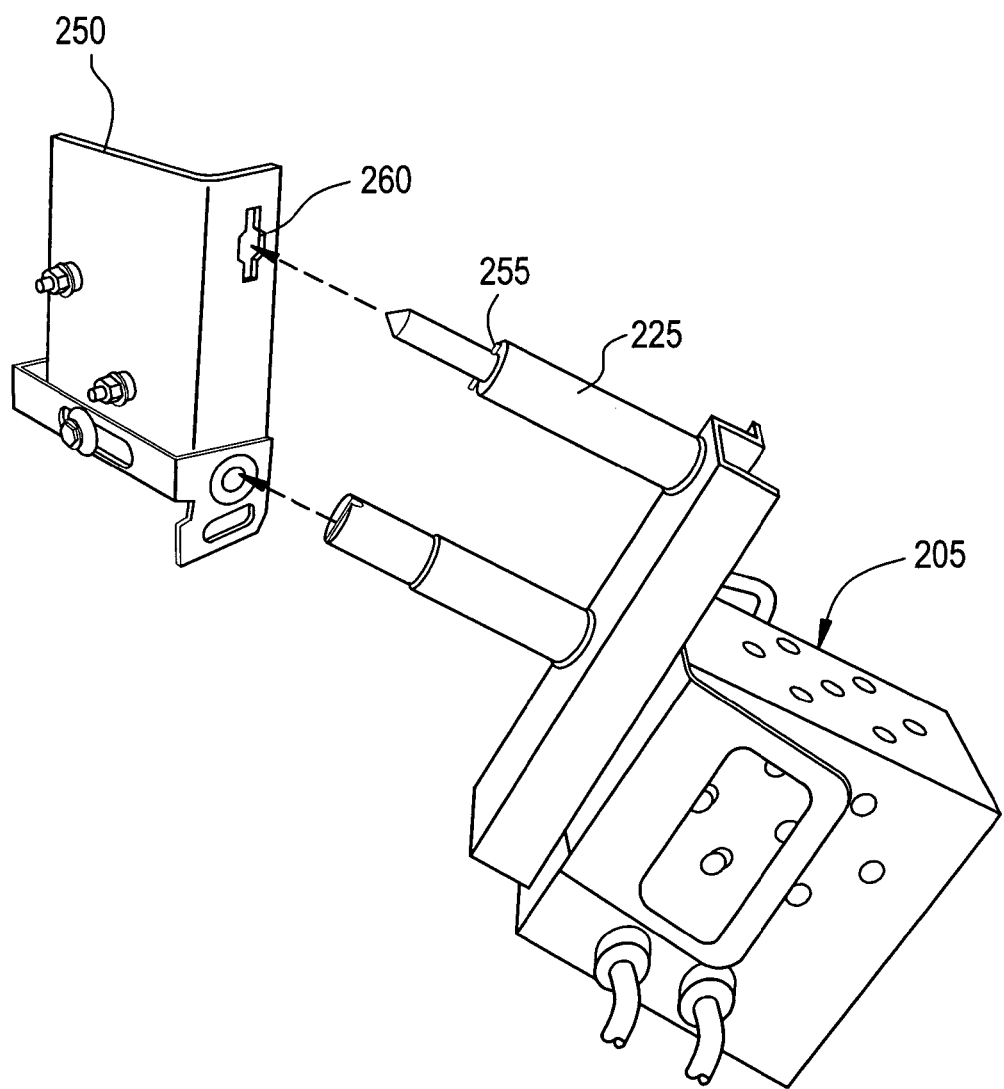
FIG. 8 depicts the operator of FIG. 6 in an exploded assembly arrangement with respect to a mating side bracket in accordance with embodiments of the invention.

Referring to FIG. 7, a circuit breaker 235, different from and larger than circuit breaker 165, is depicted racked out and drawn out of switchgear 240 and supported by draw out side rails 245. Operator 205 is attached to circuit breaker 235 by way of drive shaft 215 being engaged with racking shaft 230, in a manner discussed previously, and pin 225 being engagingly locked with circuit breaker side bracket 250. By attaching operator 205 to circuit breaker 235 in this manner, pin 225 provides a desired anti-rotation surface (the side of the pin) to prevent operator 205 from rotating during operation of the motor 105. To removably, yet securely, lock operator 205 to circuit breaker 235, and referring now to FIG. 8, pin 225 includes a cross member 255 that is inserted into and engages with a keyhole 260 in side bracket 250. Once inserted, pin 225 is rotated about a quarter turn to lock cross member 255 behind the keyhole 260, thereby securely attaching operator 205 to circuit breaker 235.

During a racking in or racking out operation, motor 105 of operator 205 drives racking shaft 230, which drives a racking mechanism 265, which in turn causes circuit breaker 235 to be racked into or out of switchgear 240. While not specifically illustrated, racking mechanism 265 is of a known type that would be known to one skilled in the art. Similar to the previous discussion, and due to the manner by which operator 205 is attached to circuit breaker 235 and engaged with racking shaft 230, operator 205 and circuit 235 move in unison during a racking in or racking out operation, absent relative motion between bracket 210 and circuit breaker 235.

As disclosed, some embodiments of the invention may include some of the following advantages: a low profile motorized racking system that does not protrude a large distance from the switchgear, thereby reducing obstruction to personnel; a motorized racking system for switchgear having an absence of actuation linkages for improved reliability; an electric racking operator that is attached directly to the circuit breaker for ease of installation and maintenance; an electric racking operator that is attached directly to the circuit breaker thereby allowing movement of the breaker relative to the switchgear door without interfering with the operation of the operator; and, a motorized racking operator that may be easily and quickly connected and disconnected for use on more than one circuit breaker.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A motorized racking operator for racking a circuit breaker into and out of electrical switchgear, the switchgear having a housing for supporting the circuit breaker, a racking shaft and a racking mechanism, the racking shaft having a receiving end for receiver an actuator, whereby rotation of the racking shaft via the actuator causes movement of the racking mechanism that results in the circuit breaker being racked into and out of the switchgear, the operator comprising:

a motor having a drive shaft, an end of the drive shaft configured to operably engage with the receiving end of the racking shaft;

an On-Off control in signal communication with the motor;

a bracket securely attached to the motor and having an anti-rotation surface; and a latch for removably securing the motor and bracket to the circuit breaker such that the motor and bracket move in unison with the circuit breaker in response to the motor driving the racking shaft to rack the circuit breaker into and out of the switchgear and the anti-rotation surface of the bracket engaging with a surface of the circuit breaker to prevent rotation of the motor in response to the motor applying a torque to the racking shaft.

2. The operator of claim 1, wherein:
the anti-rotation surface of the bracket comprises a protruding portion that engages with a recessed region of the circuit breaker.

3. The operator of claim 2, wherein:
the latch comprises a spring-biased latch.

4. The operator of claim 1, wherein:
the latch comprises a spring-biased latch.

5. The operator of claim 1, wherein:
the anti-rotation surface of the bracket comprises a pin displaced from the drive shaft and oriented parallel thereto.

6. The operator of claim 5, wherein:
the latch comprises a cross member on the pin that engages with the circuit breaker in response to the pin being rotated by about a quarter turn.

7. The operator of claim 1, wherein:
the latch comprises a pin having a cross member that engages with the circuit breaker in response to the pin being rotated by about a quarter turn.

8. The operator of claim 1, wherein:
in response to the motor driving the racking shaft to rack the circuit breaker into and out of the switchgear, the bracket moves with the circuit breaker absent relative motion therebetween.

9. The operator of claim 1, wherein:
the On-Off control is hard wired to the motor.

10. The operator of claim 1, wherein:
the bracket comprises a handle.

11. A motorized racking operator for racking a circuit breaker into and out of electrical switchgear, the switchgear having a housing for supporting the circuit breaker, a racking shaft and a racking mechanism, the racking shaft having a receiving end for receiver an actuator, whereby rotation of the racking shaft via the actuator causes movement of the racking mechanism that results in the circuit breaker being racked into and out of the switchgear, the operator comprising:
a motor having a drive shaft, an end of the drive shaft configured to operably engage with the receiving end of the racking shaft;
a bracket securely attached to the motor and having a protruding portion that engages with a recessed region of the circuit breaker; and
a spring-biased latch for removably securing the motor and bracket to the circuit breaker such that the motor and bracket move in unison with the circuit breaker in response to the motor driving the racking shaft to rack the circuit breaker into and out of the switchgear and the protruding portion of the bracket engaging with the recessed region of the circuit breaker to prevent rotation of the motor in response to the motor applying a torque to the racking shaft.

12. The operator of claim 11, wherein:
in response to the motor driving the racking shaft to rack the circuit breaker into and out of the switchgear, the bracket moves with the circuit breaker absent relative motion therebetween.

13. A motorized racking operator for racking a circuit breaker into and out of electrical switchgear, the switchgear having a housing for supporting the circuit breaker, a racking shaft and a racking mechanism, the racking shaft having a receiving end for receiver an actuator, whereby rotation of the racking shaft via the actuator causes movement of the racking mechanism that results in the circuit breaker being racked into and out of the switchgear, the operator comprising:
a motor having a drive shaft, an end of the drive shaft configured to operably engage with the receiving end of the racking shaft;
an On-Off control in signal communication with the motor;
a bracket securely attached to the motor and having a pin displaced from the drive shaft and oriented parallel thereto; and
a latch for removably securing the motor and bracket to the circuit breaker such that the motor and bracket move in unison with the circuit breaker in response to the motor driving the racking shaft to rack the circuit breaker into and out of the switchgear and the pin of the bracket engaging with a surface of the circuit breaker to prevent rotation of the motor in response to the motor applying a torque to the racking shaft.

14. The operator of claim 13, wherein:
the latch comprises a cross member on the pin that engages with the circuit breaker in response to the pin being rotated by about a quarter turn.

15. The operator of claim 14, wherein:
in response to the motor driving the racking shaft to rack the circuit breaker into and out of the switchgear, the bracket moves with the circuit breaker absent relative motion therebetween.

* * * * *